United States Patent [19]

Mittermeier

[11] Patent Number: 4,504,251

[45] Date of Patent: Mar. 12, 1985

[54] HYDRAULIC CHAIN TENSIONER

[75] Inventor: Walter Mittermeier, Stuttgart-Stammheim, Fed. Rep. of Germany

[73] Assignee: Dr. Ing. h.c.F. Porsche A.G., Fed. Rep. of Germany

[21] Appl. No.: 440,956

[22] Filed: Nov. 12, 1982

[30] Foreign Application Priority Data

Nov. 13, 1981 [DE] Fed. Rep. of Germany ....... 3145115

[51] Int. Cl.³ .............................................. F16H 7/08
[52] U.S. Cl. ..................................... 474/110; 474/91
[58] Field of Search ................ 474/91, 101, 110, 103, 474/104; 198/500, 813; 92/132, 133; 184/15.1, 15.3

[56] References Cited

U.S. PATENT DOCUMENTS

| 3,412,650 | 11/1968 | Stang, Jr. | 92/133 |
| 3,574,418 | 4/1971 | Okabe | 474/110 |
| 3,603,214 | 9/1971 | Murrell | 92/133 |

FOREIGN PATENT DOCUMENTS

| 1550993 | 1/1970 | Fed. Rep. of Germany | 474/91 |
| 2065265 | 6/1981 | United Kingdom | 474/110 |

Primary Examiner—James A. Leppink
Assistant Examiner—Mark J. DelSignore
Attorney, Agent, or Firm—Craig & Burns

[57] ABSTRACT

A hydraulic chain tensioner with a hollow piston longitudinally guided in a hydraulic housing which is closed off at the top by a plug provided with an external thread; the plug is pressed into a smooth central bore of the hollow piston and the thread grooves are in communication with the atmospheric air by way of radial channels of the hollow piston, thus permitting a venting of the hydraulic housing; a further venting possibility exists by an excess pressure valve which is built into an ante-chamber disposed parallel to the hollow piston.

11 Claims, 1 Drawing Figure

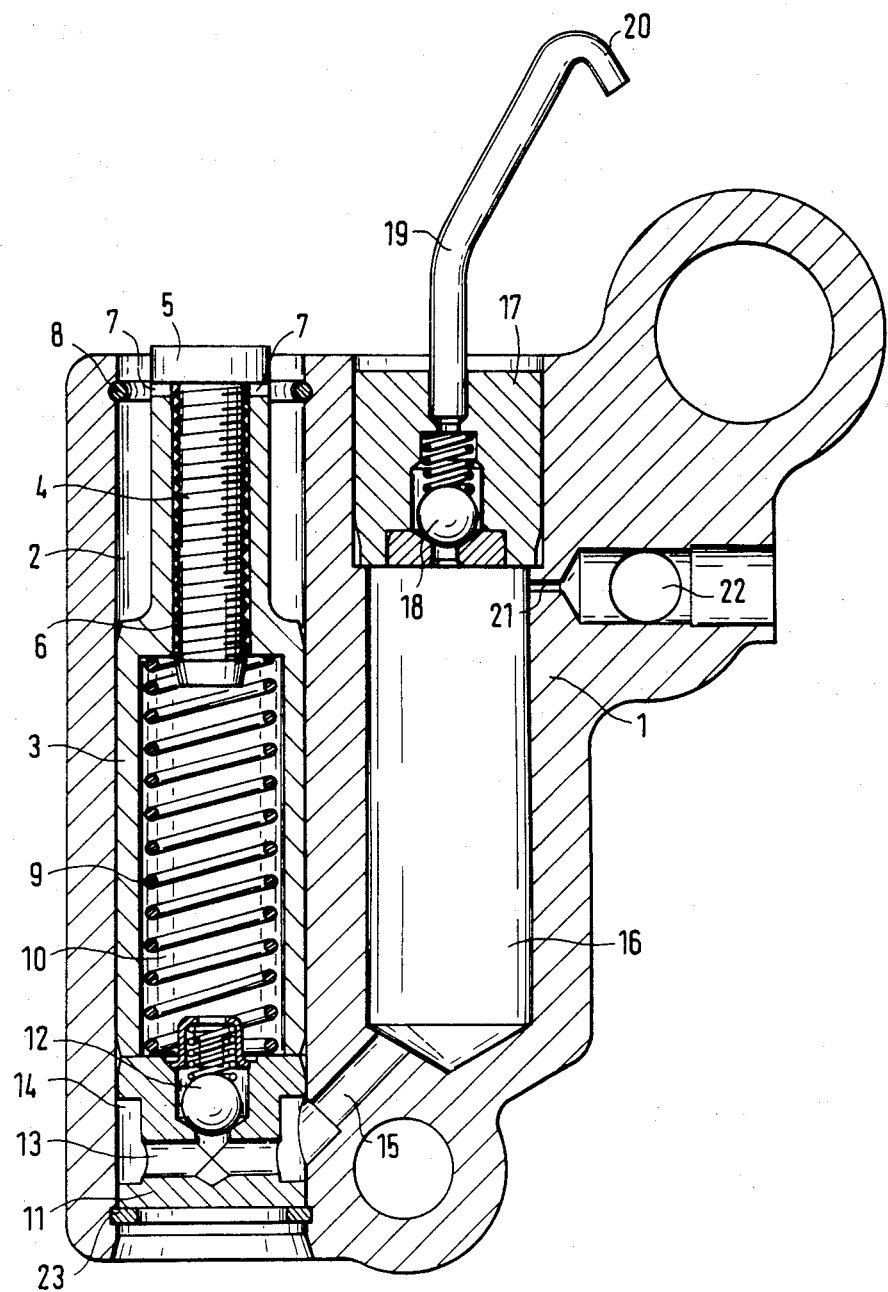

HYDRAULIC CHAIN TENSIONER

The present invention relates to a hydraulic chain tension adjuster in which a hollow piston provides for the chain tensioning and is longitudinally movable guided in a housing bore of a hydraulic housing by oil pressure at its bottom side and is additionally stressed by a compression spring.

The functioning ability of such a chain tensioner, disclosed in the German Pat. No. 849,938, depends upon whether the pressure inside of the hydraulic device and the force on the tensioning piston stressing the chain can be kept constant, respectively, and can change corresponding to the changing operating conditions of the chain operation. Prerequisite therefor is that the hydraulic housing is adapted to be vented well during the first filling with hydraulic oil and larger air accumulations can be avoided also during a longer period of operation. This is desirable to avoid the tensioning piston from carrying out undesired stroke changes as a result of the compressibility of the air. The danger of air collections exists above all when, as customary with internal combustion engines, the hydraulic chain tensioner is connected to the central pressure oil supply of the internal combustion engine since, in such case, air can enter the oil circulation at numerous places.

It is therefore the task of the present invention to keep the tensioning force of the hydraulic chain tension adjuster at a constant magnitude by a good venting of the hydraulic mechanism.

The underlying problems are solved according to the present invention in that a plug is pressed into a smooth central bore of the hollow piston at the top side thereof, whereby a large number of grooves are machined into the shank of the plug which establishes a connection between the interior space of the hollow piston and the atmospheric air. The air can escape by way of the thread grooves of the plug or stopper which closes off the hollow piston, used for chain tensioning, in the upper direction and is carried off to the atmosphere by way of cross bores of the hollow piston. In contrast thereto, the relatively great thread length of the plug represents a very high resistance for the hydraulic oil and thus produces an effective throttling for the hydraulic oil.

Further measures for keeping constant the oil pressure and the tensioning force in accordance with the present invention involve one or more of the following features. An ante-space is formed in the hydraulic housing parallel to the housing bore for the hollow piston, which is used as storage and calming space for the hydraulic oil flowing in from the central oil supply. The narrow throttle bore disposed between the ante-chamber and the oil supply serves the purpose of a limitation of the oil through-flow. If the pressure in the ante-space becomes greater than about 0.5 bar, then the excess pressure valve opens. If the pressure of the central oil supply is between 0.6 bar and 6 bar, i.e., is always higher than the opening pressure of the excess pressure valve, oil will constantly leave by way of the excess pressure valve. At the same time, the air, respectively oil-air mixture which has collected in the upper part of the ante-space is displaced toward the outside together with the oil.

In an advantageous construction of the present invention, a spray pipe is connected to the excess pressure valve, whose other end is directed toward a chain so that the oil sprayed toward the outside can be used for the purpose of chain lubrication.

These and other objects, features and advantages of the present invention will become more apparent from the following description when taken in connection with the accompanying drawing which shows, for purposes of illustration only, one embodiment in accordance with the present invention, and wherein:

The single FIGURE is a cross-sectional view through a hydraulic chain tension adjusting device in accordance with the present invention.

Referring now to the single FIGURE of the drawing, a hydraulic housing 1 is provided with a housing bore 2 extending through the hydraulic housing 1; a hollow piston 3 serving the purpose of chain tensioning is longitudinally displaceably guided in the housing bore 2. The hollow piston 3 is closed at the top by a pressed-in plug 4 which abuts with a collar 5 end-faced at the hollow piston 3 and whose shank includes an external thread. The thread grooves 6 extend over the entire shank of the plug or stopper 4 and terminate underneath the collar abutment in radial channels 7 of the hollow piston, which establish a connection with the atmospheric air. In the upward direction, the movement of the hollow piston 3 is limited by a snap ring 8 installed into the housing bore 3. The hollow piston 3 is stressed from below by a compression spring 9 which is arranged in the cylindrical interior space 10 thereof and is supported against a support member 11 which is pressed-in from below into the housing bore 2 and is additionally secured by a retaining ring 23. A ball check valve 12 is installed centrally in the retaining member 11, which opens in the direction toward the interior space 10 of the hollow piston 3 at a pressure of about 0.2 bar. It is in communication by way of a cross channel 13 and a recess 14 of the retaining member 11 as well as by way of a bore 15 of the hydraulic housing 1 adjoining the recess 14 with a cylindrical ante-chamber 16 which is disposed parallel to the housing bore 2. The ante-chamber 16 is closed off by a ring 17 that contains a central spring-loaded ball excess pressure valve 18. A spray pipe 19 is inserted into the central bore of the ring 17 disposed thereabove, whose other bent end 20 is directed toward a chain (not shown) of the internal combustion engine. The ante-chamber 16 is connected by way of a throttle bore 21 disposed radially with respect thereto with a channel 22 that establishes a connection to the oil supply of the internal combustion engine.

During charging of the chain adjuster, hydraulic oil enters through the duct 22 and the throttling port 21, enters the cylindrical ante chamber 16, flows through the borehole 15 into the transverse duct 13 and to the ball check valve 12, that is still closed. During continued charging, the hydraulic oil continues to rise in the ante chamber 16 and thus pushes the air in the chamber and possible air bubbles that may have been trapped in the hydraulic oil into the upper part of the ante chamber. When the ante chamber 16 is completely filled and a pressure has been built up in it of about 0.2 bar, the ball check valve 12 will open and the hollow piston 3 will be charged with hydraulic oil until the oil comes out at the radial ducts 7.

Accordingly, when the hollow piston 3 is stressed from the direction of the collar by the beating of the chain, a very hard resistance can be noticed since the piston is filled completely with an incompressible fluid; in this case, the pressure in the hollow piston 3 may rise to 15 bar. In the case of such high pressure, overflow oil flows in the external thread of the plug 4 and flows to the outside through the radial ducts 7. Together with this overflow oil, air is pushed out that, during the operation of the chain adjuster, had accumulated in the upper part of the hollow piston 3, so that a continuous venting of the hollow piston takes place via the plug 4. In order to be able to also continuously vent the ante chamber 16, the feed pressure of the hydraulic oil is kept higher than the opening pressure of the excess pressure ball valve 18 that is adjusted to about 0.5 bar. It is thus always open and permits the oil-air mixture accumulating in the upper part of ante chamber 16 to go out into the open air. This oil-air mixture which flows continuously at a low flowing force, is directed toward the chain via the spraying pipe 19 and is thus used for the lubrication of the chain.

During service or repair operations at the internal combustion engine, the plug 4 whose thread grooves 6 may have possibly become covered with dirt or oil residues, can be readily exchanged.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A hydraulic chain tension adjusting device, comprising a hydraulic housing means provided with a housing bore, a hollow piston means serving the purpose of chain tensioning which is longitudinally guided in said housing bore, said hollow piston means being under oil pressure at its bottom side and being spring-loaded additionally by a compression spring, characterized in that a plug means is pressed into a substantially smooth central bore of the hollow piston means at the top side thereof, said plug means including a shank into which a groove means is machined for establishing a connection between the interior space of the hollow piston means and the atmospheric air.

2. A hydraulic tension adjusting device according to claim 1, characterized in that the chain tension adjusting mechanism is for an internal combustion engine.

3. A hydraulic chain tension adjusting device according to claim 1, characterized in that said groove means includes an external thread.

4. A hydraulic chain tension adjusting device according to claim 1, characterized in that an elongated ante-chamber means adapted to be connected to a central pressure oil supply of an internal combustion engine is provided in the housing means substantially parallel to the housing bore for the hollow piston means, a connecting channel being provided in the bottom of the ante-chamber means leading to the housing bore means while the top side thereof includes an excess pressure valve means.

5. A chain tension adjusting mechanism according to claim 4, characterized in that the ante-chamber means is operable to be connected by way of a throttle bore with the central pressure oil supply of the internal combustion engine.

6. A chain tension adjusting mechanism according to claim 5, characterized in that a spray pipe means is connected to the excess pressure valve means, by means of which during opening of the excess pressure valve means the oil-air mixture collected in the upper part of the ante-chamber means escapes and is adapted to be sprayed onto a chain.

7. A chain tension adjusting mechanism according to claim 6, characterized in that the interior space of the hollow piston means is operatively connected to ante-chamber means by way of a check valve which precludes a return flow of oil into the ante-chamber means.

8. A chain tension adjusting mechanism according to claim 4, characterized in that a spray pipe means is connected to the excess pressure valve means, by means of which during opening of the excess pressure valve means the oil-air mixture collected in the upper part of the ante-chamber means escapes and is adapted to be sprayed onto a chain.

9. A chain tension adjusting mechanism according to claim 4, characterized in that the interior space of the hollow piston means is operatively connected to the ante-chamber means by way of a check valve which precludes a return flow of oil into the ante-chamber means.

10. A hydraulic chain tension adjusting device according to claim 7, characterized in that said groove means includes an external thread.

11. A chain tension adjusting mechanism according to claim 1, characterized in that the interior space of the hollow piston means is operatively connected to an ante-chamber means by way of a check valve which precludes a return flow of oil into the ante-chamber means.

* * * * *